(12) United States Patent
Mattela et al.

(10) Patent No.: US 11,983,537 B1
(45) Date of Patent: May 14, 2024

(54) MULTI-THREADED PROCESSOR WITH POWER GRANULARITY AND THREAD GRANULARITY

(71) Applicant: CEREMORPHIC, INC., San Jose, CA (US)

(72) Inventors: Venkat Mattela, San Jose, CA (US); Heonchul Park, Pleasanton, CA (US); Radhika Ponnamaneni, Telangana (IN); Govardhan Mattela, Hyderabad (IN)

(73) Assignee: Ceremorphic, Inc., San Jose, CA (US)

( * ) Notice: Subject to any disclaimer, the term of this patent is extended or adjusted under 35 U.S.C. 154(b) by 0 days.

(21) Appl. No.: 18/086,458

(22) Filed: Dec. 21, 2022

(51) Int. Cl.
G06F 9/38 (2018.01)
G06F 9/30 (2018.01)

(52) U.S. Cl.
CPC ........ *G06F 9/3802* (2013.01); *G06F 9/30101* (2013.01); *G06F 9/382* (2013.01); *G06F 9/3851* (2013.01); *G06F 9/3873* (2013.01)

(58) Field of Classification Search
CPC ... G06F 9/3802; G06F 9/3851; G06F 9/30101
See application file for complete search history.

(56) References Cited

U.S. PATENT DOCUMENTS

| 6,233,599 | B1 * | 5/2001 | Nation | G06F 9/30127 |
| | | | | 712/E9.027 |
| 7,360,064 | B1 * | 4/2008 | Steiss | G06F 9/3851 |
| | | | | 712/214 |
| 7,925,869 | B2 * | 4/2011 | Kelsey | G06F 1/3275 |
| | | | | 712/220 |
| 2007/0055839 | A1 * | 3/2007 | Hanes | G06F 9/462 |
| | | | | 712/E9.053 |
| 2010/0082944 | A1 * | 4/2010 | Adachi | G06F 9/3867 |
| | | | | 712/E9.049 |
| 2012/0260070 | A1 * | 10/2012 | Vasekin | G06F 9/3851 |
| | | | | 712/215 |
| 2014/0109098 | A1 * | 4/2014 | Sato | G06F 9/3814 |
| | | | | 718/102 |
| 2021/0072995 | A1 * | 3/2021 | Kallam | G06F 9/30123 |

* cited by examiner

*Primary Examiner* — Jacob Petranek
(74) *Attorney, Agent, or Firm* — File-EE-Patents.com; Jay A. Chesavage

(57) ABSTRACT

A multi-stage processor has a pre-fetch stage, and a sequence of pipelined processor stages. A thread map register contains thread identifiers, and a thread map valid register has locations corresponding to the thread map register and indicating whether a value in the thread map register is to be fetched or not, and a thread map length register indicates the number of thread map register locations forming a canonical sequence of thread identifiers to the pre-fetch stage. The pre-fetch stage does not act on a thread identifier with a not valid thread map valid value, thereby saving power in low demand conditions.

19 Claims, 2 Drawing Sheets

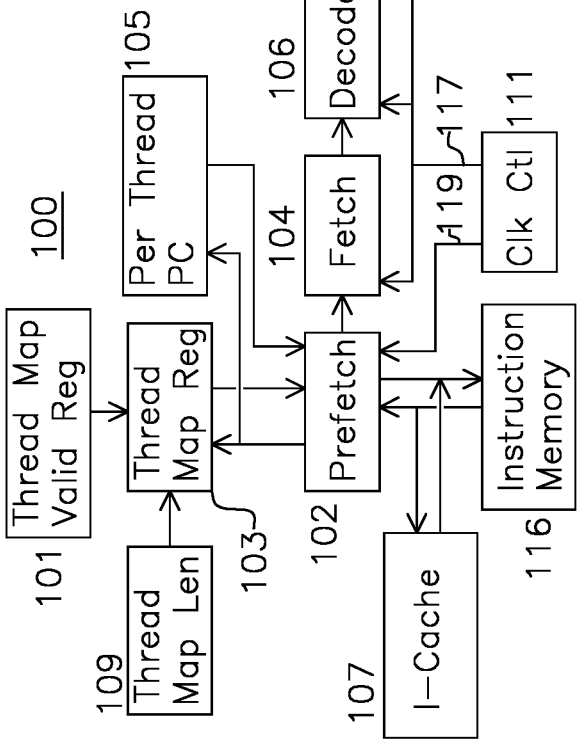
*Figure 1*
Thread Granularity in pipeline architecture
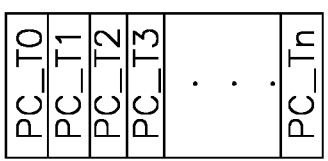
*Figure 1B*
*Figure 1A*
per-thread Program Counters

Figure 2A

202A
Thread map register (sequential) 204

| 0 | 1 | 2 | 3 | 4 | 5 | 6 | 7 | 8 | 9 | 10 | 11 | 12 | 13 | 14 | 15 | 0 | 1 | 2 | 3 |
|---|---|---|---|---|---|---|---|---|---|----|----|----|----|----|----|---|---|---|---|
| T0 | T0 | T1 | T1 | T1 | T1 | T2 | T2 | T2 | T2 | T2 | T2 | T2 | T2 | T3 | T3 | T0 | T0 | T1 | T1... |

206A — T0 thread stall 212
208A — T3 thread stall 214

T0: 2/16
T1: 4/16
T2: 8/16
T3: 2/16

Figure 2B  210  Thread map valid register

202B: | 1 | 1 | 1 | 1 | 1 | 1 | 1 | 1 | 1 | 1 | 1 | 1 | 1 | 1 | 0 | 0 | 1 | 1 | 1 | 1... |
202C: | 1 | 0 | 1 | 0 | 0 | 0 | 1 | 0 | 0 | 0 | 0 | 0 | 0 | 0 | 0 | 0 | 1 | 0 | 1 | 0... |

Figure 2C  220  Thread map register (non-sequential)

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| T0 | T3 | T1 | T2 | T1 | T2 | T2 | T0 | T3 | T2 | T1 | T2 | T1 | T2 | T2 | T2 |

222
224
226

Figure 2D  Thread map valid register

228: | 1 | 1 | 1 | 1 | 1 | 1 | 1 | 1 | 1 | 1 | 1 | 1 | 1 | 1 | 1 | 1 |
230: | 1 | 1 | 1 | 1 | 0 | 0 | 0 | 0 | 0 | 0 | 0 | 0 | 0 | 0 | 0 | 0 |

MULTI-THREADED PROCESSOR WITH POWER GRANULARITY AND THREAD GRANULARITY

TECHNICAL FIELD OF THE INVENTION

The present invention relates to a multi-threaded processor. More specifically, the invention relates to a multi-threaded processor with the characteristic of granular and dynamic thread allocation such that each thread may be dynamically allotted a variable percentage of Central Processing Unit (CPU) processing capacity, and where active thread cycles can be controlled with the same granularity as the thread allocation.

BACKGROUND OF THE INVENTION

Multi-threaded processors are utilized when a system is running multiple executable processes (processor instructions), each operative in its own separate thread. Examples of prior art multi-threaded processors and uses are described in U.S. Pat. Nos. 7,761,688, 7,657,683, and 8,396,063. In a typical application program using an example of a dedicated two thread processor, the processor alternates execution cycles between execution of instructions for a high priority program on a first thread and lower priority programs on a second thread, and the alternating execution results in an allocation of 50% of CPU processing capacity to each thread. Additionally, the allocation of CPU bandwidth to each thread is protected, in that during a thread stall, such as when a first thread accesses an external peripheral and must wait for data to return, the second thread may continue execution unaffected by the stall of the first thread.

A problem arises where the multi-threaded processor has a widely varying load, and has thread allocations which handle intervals of maximum processing capacity, but is not fully subscribed with thread tasks at other times, or one or more of the threads is not busy for intervals of time which may be predictable in advance. Because each executed cycle of the processor consume power, the unused cycles result in wasted power consumption. During intervals of unused thread cycles or reduced computation requirement, excess power is consumed. It is desired to reduce power consumption during lower demand intervals.

SUMMARY OF THE INVENTION

In one example of the invention, a multi-thread processor has, in sequence, a pre-fetch stage, a fetch stage, a decode stage, a decode/execute stage, an execute stage, a load/store stage, and an optional writeback stage. The pre-fetch stage receives an instruction which is provided by a per-thread program counter under the direction of a thread map register combined with a thread map valid register. The thread map register and thread valid register have associated entries, such that each thread identifier position of the thread map register has a corresponding entry in the thread map valid register, and the thread map valid register indicates whether a thread execution cycle should occur during the associated thread map register cycle. The thread map register provides a canonical succession of thread identifiers which provide an index into a list of the per-thread program counters to select a program counter for the identified thread, and the selected program counter directs the pre-fetch stage to receive the instruction from the instruction memory. When the corresponding location of the thread map valid register is false, the instruction fetch stage and instruction decode stage are inactive, such as by "clock swallowing", whereby a clock cycle is not provided to the instruction fetch stage and the instruction decode stage for that thread identifier cycle, thereby reducing the power consumption of that cycle. Both the thread map register and thread map valid registers are accessible to a program executing on the processor, which may devote a task to updating the thread map register and thread map valid register accordingly. The decode/execute stage is coupled to a register file which selects the register file associated with the thread being executed by the decode/execute stage at that time so that the thread-specific register set is addressed.

The thread map register identifies the particular thread being executed, where the thread map register may refer to any number of different threads, subject to the limit of the number of per-thread program counters and per-thread register files. The thread map valid register indicates that a corresponding location of the thread map register is to be executed, and when the thread map valid register indicates that a corresponding location of the thread map register is not valid, the associated instruction for the thread identified in the thread map register is not fetched or executed while the remaining pipelined stages process the other threads and continue execution without interruption. For example, when all of the corresponding thread map register valid bits are true, the thread map register may contain 10 canonical entries (whereby the same sequence repeats after the end of the sequence), and the number of per-thread program counters and per-thread register files may be 4. In this case, the granularity of each of the 4 threads may be specified to 10%, such that thread_0 may receive 1 cycle, thread_1 may receive 4 cycles, thread_2 may receive 3 cycles, and thread 3 may receive 2 cycles. The thread register, without limit, may specify any of [0,1,1,1,1,2,2,2,3,3], which are canonically executed, a '1' value indicating 'true' or 'valid' with the thread map valid register containing [1,1,1,1,1,1,1,1,1,1], indicating that all thread map locations are executed. a '0' would indicate a corresponding thread map location is 'not valid' or 'false' and not executed, such as by not fetching the associated program counter. The thread map register may be updated to change thread numbers or allocation of threads, for example, thread 0 may be expanded and thread 1 reduced, such as by writing the new values [0,0,0,0,1,2,2,2,3,3] to the thread map register. In another example of the invention using the above thread map register, thread 1 may be inactive for an interval of time, for which the thread map register would continue to contain [0,1,1,1,1,2,2,2,3,3] and the thread map valid register modified to contain [1,0,0,0,0,1,1,1,1,1]. During cycles the thread map valid register contains 0, the instruction fetch stage and instruction decode stage are not active, and executable instructions are not passed down the processor stage pipeline, thereby reducing power consumption compared to a prior art method of executing NOP (no operation) instructions.

OBJECT OF THE INVENTION

A first object of the invention is a multi-thread processor having a series of pipelined stages, each pipelined stage providing the results of an operation to a successive stage, the first of the pipeline stages receiving an instruction from a program memory address referenced by thread identifier and associated program counter, the thread identifier provided by a thread map register containing a sequence of thread identifiers, the thread map register also having a corresponding thread map valid register indicating cycles for an instruction fetch stage to either retrieve the associated thread instruction or for the instruction fetch stage to not retrieve an instruction, such as by clock swallowing whereby all stages receive a pipeline clock cycle forwarding results, but the instruction fetch stage does not receive a pipeline clock cycle, each thread identifier indicating which of several program counters and register files is to be used by a particular processor stage, the particular instruction selected using the thread identifier and per thread program counter provided to a sequence of pipelined stage comprising an instruction fetch stage, instruction decode stage, decode/execute stage, execute stage, load/store stage, and writeback stage, the decode/execute stage coupled to the register file selected by thread identifier.

A second object of the invention is a multi-thread processor having a thread map register and corresponding thread map valid register indicating which locations of the thread map register to utilize, the thread map register re-programmable to dynamically identify a sequence of threads to be executed, each thread associated with a program counter register and a register file, the program counter register and register file coupled to at least one of the sequential stages: a pre-fetch stage, an instruction fetch stage (also referenced as a fetch stage), an instruction decode stage, a decode/execute stage, an execute stage, a load-store stage, and a writeback stage. Each stage is part of a pipeline, whereby results from one stage are transmitted to a subsequent stage on a shared clock boundary, such as with the use of inter-stage registers transferring results between stages, each stage operating from a common clock.

A third object of the invention is a multi-thread processor having a series of cascaded stages, each cascaded stage providing the results of an operation to a successive stage, the first of the cascaded stages receiving a program memory address referenced by a thread identifier and associated program counter, the thread identifier provided by a thread map register containing a sequence of thread identifiers, each location corresponding to a location in a thread map valid register indicating whether to retrieve the associated thread instruction or for the instruction fetch stage to not take action based on the corresponding binary value of the thread map valid register location, and a thread map length register indicating a number of thread map register locations to use in a canonical sequence, the thread map valid register disabling retrieval of an instruction from the corresponding thread map register, the disabling being done such as by disabling the instruction pre-fetch stage and/or instruction fetch stage using clock swallowing, whereby the instruction fetch stage does not receive a clock cycle, each thread identifier indicating which of a program counter and register file is to be used by a particular processor stage, the particular instruction selected using the thread identifier and per thread program counter provided to a sequence of pipelined stage comprising an instruction fetch stage, instruction decode stage, decode/execute stage, execute stage, load/store stage, and writeback stage, the decode/execute stage coupled to the register file selected by thread identifier.

A fourth object of the invention is a multi-thread processor having a thread map register and thread map valid register having corresponding locations to the thread map register and indicating which locations of the thread map register are valid for thread execution, and also a thread map length register indicating how many thread map positions form the canonical sequence of thread identifiers to use, the thread map register and thread map valid register re-programmable to dynamically identify a sequence of threads to be executed, each thread associated with a program counter register and a register file, the program counter register and register file coupled to at least one of the sequential stages comprising: a prefetch stage, an instruction fetch stage, an instruction decode stage, a decode/execute stage, an execute stage, a load-store stage, and an optional writeback stage.

FIELD AND BACKGROUND OF THE INVENTION

At least one specification heading is required. Please delete this heading section if it is not applicable to your application. For more information regarding the headings of the specification, please see MPEP 608.01(a).

BRIEF DESCRIPTION OF DRAWINGS

FIG. 1 shows a block diagram for a multi-thread processor having thread granularity and granular per-thread execution control.

FIG. 1A shows a block diagram for the organization of the per-thread program counters.

FIG. 1B shows a block diagram for an example of the thread map register and associated thread map valid register.

FIGS. 2A and 2B show a thread map register and associated thread map valid register for an example of the thread map register for a sequential mapping of threads and a given thread allocation.

FIGS. 2C and 2D show a thread map register and associated and thread map valid register for a non-sequential mapping of threads of FIG. 2A.

DETAILED DESCRIPTION OF THE INVENTION

FIG. 1 shows an example of the invention for a multi-thread scalar processor 100 having the sequential pipelined stages: pre-fetch stage 102, fetch stage 104, decode stage 106, decode/execute stage 108, execute stage 110, load/store stage 112, and writeback stage 114, where the pipeline refers to a common clock applied to each stage so that each stage forwards results on to the next stage upon assertion of the common clock. The thread map register selects sequential canonical locations which provide a thread identifier, which references a program counter 105 value sent to prefetch stage 102. The program counter addresses delivered to pre-fetch stage 102 are sequentially executed by each subsequent stage on separate clock cycles, carrying forward any context and intermediate results required for the following stage. In one example of the invention, a thread map register 103 provides a canonical sequence of thread identifier (thread_id) and thread map valid bit for delivery to the per-thread program counter 105. When the thread map valid is true, the associated current program counter 105 address is provided to prefetch stage 102, which retrieves the associated instruction from instruction memory 116 (or from instruction cache 107 if the location is cached) and delivers it to fetch stage 104 on a subsequent clock cycle, which fetches the executable instruction. The decode stage 106 or decode/execute stage 108 is coupled to per-thread register file 118, which is responsive to read requests from decode/execute stage 108, or writeback operations from stage 114, each of which are thread-specific, so the data read or written to the register file 118 corresponds to the thread_id which is requesting or providing it. The thread map valid register 101 indicates whether the associated thread map identifier from the thread map register 118 is delivered to the prefetch stage 102, or alternatively, whether the prefetch stage 102 is active for that particular clock cycle. An additional thread map length register 109 indicates how many locations of the thread map register (starting from location 0) form the canonical sequence of thread IDs send to the pre-fetch stage and per-thread program counter 105 lookup. For example, a thread map length of 4 would indicate the thread identifiers issued would be a canonical sequence from thread map register locations 0-1-2-3-0-1-2-3, etc.

One mechanism for turning off the pre-fetch stage 102 when a location of the thread valid match register is '0' is by controlling delivery of the pipeline clock to the prefetch stage 102 while delivering the pipeline clock to the fetch 104, decode/execute 108, execute 110, load-store 112, and writeback 114 stages. This "clock swallowing" method may be performed with a clock control stage 111 which delivers a conditionally swallowed clock 119 (based on the thread map valid bit from 101 being '0'), while delivering a continuous pipeline stage clock to the other pipeline stages 104 to 114, where each stage has an input register which clocks in results from a previous pipeline stage on a clock 117, 119 edge.

FIG. 1A shows a plurality of per-thread program counters 105 PC_T0 for thread_0, PC_T1 for thread_1, . . . , PC_Tn for thread n, such that one program counter is separately operative for use with each thread. PC_T0 contains the current program counter value for thread 0, PC_T1 contains the current program counter value for thread 1, etc., and the canonical sequence of thread identifiers from thread map register 103 indicate which thread program counter is to be retrieved.

FIG. 1B shows the thread map register 103 of FIG. 1, which comprises a sequence of thread identifiers T0 130A to Tn 132A executed canonically, and each thread location of thread map register 103 has a corresponding thread map valid register 101 location shown as 130₁3 through 132₆ of FIG. 1B, indicating whether the associated thread map register location is to be executed (indicated by '1') or not executed (indicated by '0'), such as by conditionally issuing an instruction to retrieve a program counter at prefetch stage 102 of FIG. 1 based on the corresponding location of the thread map register 101. The number of threads (each thread being a separate process executing in a CPU cycle of a particular stage) is m, limited by the number of register files 118 and program counters 105, and the thread map register 103 may support m threads in n thread map register locations (n>m) for control of the allocation of CPU bandwidth to thread. For greater n with fixed m, increased granularity of thread control is available. For example, a thread map with 16 entries may support 4 threads, each thread having granularity of 1/16 of the available CPU processing capacity and supporting anywhere from 0/16 to 16/16 of the available CPU processing capacity, subject to allocation of CPU processing capacity to the remaining threads.

FIG. 2A shows an example 16 entry thread map register 103 of FIG. 1 over canonical cycle length 204 of FIG. 2 (using the length specified by thread map length register 109 of FIG. 1, the thread map register canonically repeating at the end of each 16 entries for the case where thread map register 109 contains the value 16). Execution of only threads 0 and 1 would occur if thread map register length was changed to 6, executing only thread map register locations 0 to 5 canonically. The present example of FIG. 2A is shown for 4 threads and sequential mapping, which may be suitable for applications without thread stalls, the case where a thread is unable to execute sequential cycles because of a delay in receiving a result from an external resource, for example. For n=16 thread map length and the values shown in 202A, the thread map register provides 1/16th resolution of processor application to each task. The processor can be used with one thread per thread map register location (number of threads m=number of thread map locations n), however this inflexibly provides a fixed allocation of time to each thread. In a preferred utilization, the number of thread identifiers m is smaller than the number of thread map register locations n, which provides that the allocation of a particular thread to a task may have the granularity p/n, where n is typically fixed and p is programmable as the number of cycles allocated to a particular thread, and can be varied from 0 to n to allocate more or less computational resource to each thread by reallocating other thread map locations to a desired thread.

FIG. 2A shows an example thread map register for a four thread processor in a 16 position thread map register 202, with threads 0, 1, 2, and 3 (T0, T1, T2, T3, respectively), and processor capacity allocated to 12.5%, 25%, 50%, and 12.5%, to each respective thread using the thread map valid register 202B which has all thread map locations shown as valid (1) and thread map register length is 16. In this case, the thread execution sequence is as shown, two cycles of T0, four cycles of T2, eight cycles of T3, and two cycles of T3 in a canonical sequence. Thread map valid register 202C shows another example with the same thread map register 202A, where only the first thread identifier of each sequence is occupied, shown as T0 T1 T2 T3 over 16 cycles. The advantage of sparse thread map 202C is that the additional execution cycles can be gained by writing additional '1' values only to the thread map valid register, so if a task has predictable load requirements, the thread map register can have thread map allocations which are configured for the high load requirement, and a dynamic adjustment can be made to the thread map valid register to change the number of execution cycles associated with the dynamic load thread without changing the thread map register, the unexecuted cycles resulting in reduced power consumption.

A problem arises where a particular thread must wait for an external resource to respond, known as a thread stall. In the example of FIG. 2A, the decode/execute stage 108 of FIG. 1 may require reading an external shared memory or media access controller (MAC) not shown, and the delay in reading the external resource may require 4 clock cycles. In the case where the thread allocation 202A is shown in FIG. 2A and the threads accessing an external resource are T0 and T3, or are otherwise subject to delays in reading or writing devices, T0 will be in a thread stall at operation 208A, and T3 will be in a thread stall 214 at cycle 210. With the arrangement of thread identifiers shown in FIG. 2A, this will result in loss of an otherwise available CPU cycle for each thread stall.

FIG. 2C shows an alternative thread map register 222 and thread map valid register 228, where the thread mapping uses the same time allocation of FIG. 2A, but with the thread sequence 220 rearranged for the same thread stall case as was shown in FIG. 2A. The rearrangement of T0 to positions 0 and 7, and rearrangement of T3 to positions 1 and 8, is reflected in the arrangement of FIG. 2B. The T0 thread is only stalled for thread stalls longer than 6 clock cycles 224, whereas the thread stall 212 is 4 clock cycles, so both occurrences of T0 are executed with the arrangement of FIG. 2B, rather than one in FIG. 2A. Similarly, the T3 stall which causes the second T3 cycle of FIG. 2A to be deferred does not occur in FIG. 2B unless the thread stall has duration 226. A thread map valid register 230 is presented which is analogous to the single cycle thread execution of 202C.

Alternatively, a thread stall can be avoided in a repeating sequence of the same thread identifier by writing '0' (not valid) to subsequent same thread identifier locations for a duration of expected latency, saving power over null or NOP instruction cycles of the stall interval.

In another example of the invention, the thread map register and/or the thread map valid register, or the thread map length register may be interactively changed according to process demands detected by a separate management process. Since the context from each stage is forwarded to a subsequent stage of FIG. 1, changes to the thread map register may be done at any time, subject to synchronous clocking requirements for the prefetch stage 102 to receive a deterministic thread_ID and the associated per-thread program counter 105.

The invention claimed is:

1. A multi-thread processor comprising:
a thread map register having a plurality of locations containing thread identifier values, the thread map register providing a canonical sequence of thread identifiers with a canonical length determined by a thread map length register value, each location of the thread map register having a corresponding location in a thread map valid register;
a thread identifier selected from the canonical sequence of thread map values, each thread identifier having an associated thread map valid value provided to an instruction prefetch first stage;
when the thread map valid value is true, the instruction prefetch first stage returning a program counter value associated with the thread identifier;
when the thread map valid value is false, the instruction prefetch first stage taking no action;
a plurality of subsequent pipelined stages including a second pipelined stage receiving a program counter associated with a thread identifier from the prefetch stage.

2. The multi-thread processor of claim 1 where the plurality of pipeline stages comprise, in sequence:
a fetch stage, a decode stage, a decode-execute stage, an execute stage, a load-store stage, and a writeback stage.

3. A The multi-thread processor of claim 1 where the prefetch stage uses a program counter value to access an instruction from either instruction memory or instruction cache memory.

4. The multi-thread processor of claim 1 where a number of bits for storing a thread identifier in the thread map register is two bits or three bits per said thread map register location.

5. The multi-thread processor of claim 1 where a number of bits for storing a thread map valid value is 1 bit per said thread map valid location.

6. The multi-thread processor of claim 1 where a number of register files and program counters is equal to a number of unique thread identifiers.

7. The multi-thread processor of claim 1 where the instruction prefetch first stage taking no action comprises the instruction prefetch first stage not retrieving a program counter associated with a thread identifier.

8. The multi-thread processor of claim 1 where the instruction prefetch first stage taking no action comprises the instruction prefetch first stage not being provided a pipeline clock.

9. The multi-thread processor of claim 8 where other pipeline stages continue to receive a pipeline clock.

10. A multi-thread processor comprising:
a thread map register having a plurality of locations and thread map valid register having corresponding locations to the thread map register;
a thread map length register controlling a length of a canonical sequence of thread identifiers provided by the thread map register;
the thread map valid register locations containing a valid or invalid value, a valid value indicating that a thread identifier from a corresponding location of the thread map register be provided to a pre-fetch stage, and an invalid value indicating that a thread identifier from a corresponding location of the thread map register not be provided to the pre-fetch stage;
a thread map length register indicating how many thread map positions form a canonical sequence of thread identifiers provided to the pre-fetch stage;
the thread map register and thread map valid register re-programmable to dynamically identify a sequence of threads to be executed, each thread identifier being associated with a program counter register and a register file;
the program counter register and register file coupled to at least one of the sequential pipelined stages: the prefetch stage, an instruction fetch stage, an instruction decode stage, a decode/execute stage, an execute stage, a load-store stage, and a writeback stage;
the pipelined stages receiving a pipeline clock.

11. The multi-thread processor of claim 10 where the corresponding location of the thread map register not be provided to the pre-fetch stage comprises not delivering the pipeline clock to the pre-fetch stage.

12. The multi-thread processor of claim 10 where the corresponding location of the thread map register not be provided to the pre-fetch stage comprises the pre-fetch stage not taking action on the thread identifier.

13. The multi-thread processor of claim 10 where the thread map register, thread map valid register, and thread map length register are programmable registers.

14. The multi-thread processor of claim 10 where each location of the thread map register has two or three bits for encoding a thread identifier, and each location of the thread map valid register is a single bit.

15. A multi-thread processor comprising:
a thread map register having a plurality of locations, each location for the storage of a thread identifier;
a thread map valid register having a number of locations equal to a number of locations of the thread map register, each location of the thread map valid register indicating whether a corresponding thread identifier from the thread map register is to be executed or not executed;
each thread identifier of the thread map register associated with a program counter register and a register file, the program counter register and register file coupled to at least one of the sequential stages: a prefetch stage, an instruction fetch stage, an instruction decode stage, a decode/execute stage, an execute stage, a load-store stage, and a writeback stage.

16. The multi-thread processor of claim 15 where the corresponding location of the thread map register not executed comprises not delivering the pipeline clock to the pre-fetch stage.

17. The multi-thread processor of claim 15 where the corresponding location of the thread map register not executed comprises the pre-fetch stage not taking action on the thread identifier.

18. The multi-thread processor of claim 15 where the thread map register, thread map valid register, and thread map length register are programmable registers.

19. The multi-thread processor of claim 15 where each location of the thread map register has two or three bits for encoding a thread identifier, and each location of the thread map valid register is a single bit.

* * * * *